US010665390B2

(12) United States Patent
Yamaguchi et al.

(10) Patent No.: US 10,665,390 B2
(45) Date of Patent: May 26, 2020

(54) BENDING DEVICE FOR A WIRE

(71) Applicant: TOYOTA JIDOSHA KABUSHIKI KAISHA, Toyota-shi, Aichi-ken (JP)

(72) Inventors: Daiki Yamaguchi, Toyota (JP); Tsuyoshi Matsuo, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 263 days.

(21) Appl. No.: 15/835,690

(22) Filed: Dec. 8, 2017

(65) Prior Publication Data
US 2018/0182544 A1 Jun. 28, 2018

(30) Foreign Application Priority Data
Dec. 27, 2016 (JP) .................. 2016-252620

(51) Int. Cl.
*H01F 41/077* (2016.01)
*H02K 15/04* (2006.01)
*H01F 41/082* (2016.01)
*B21D 11/06* (2006.01)
*B21F 3/02* (2006.01)

(52) U.S. Cl.
CPC ......... *H01F 41/077* (2016.01); *H01F 41/082* (2016.01); *H02K 15/045* (2013.01); *B21D 11/06* (2013.01); *B21F 3/02* (2013.01)

(58) Field of Classification Search
CPC .... H01F 41/071; H01F 41/077; H01F 41/082; H01F 41/09; H02K 15/045; H02K 15/04; Y10T 29/53226; Y10T 29/5327; B21F 3/00; B21F 3/02; B21F 3/04; B21D 11/06; B21D 7/02; B21D 7/024; B21D 7/04

See application file for complete search history.

(56) References Cited

U.S. PATENT DOCUMENTS

2010/0000624 A1   1/2010 Matsushita et al.
2013/0333432 A1*  12/2013 Honda ................ H01F 27/2847
                                                              72/66
2016/0294263 A1*  10/2016 Hashimoto ............... H01F 5/04

FOREIGN PATENT DOCUMENTS

| CN | 201862709 U  |   | 6/2011  |           |
|----|--------------|---|---------|-----------|
| JP | H11-192514 A |   | 7/1999  |           |
| JP | 2003-181579 A|   | 7/2003  |           |
| JP | 2007-319915 A|   | 12/2007 |           |
| JP | 2008-228435 A|   | 9/2008  |           |
| JP | 2012235560 A | * | 11/2012 | ........... H02K 15/045 |
| JP | 2015-033267 A|   | 2/2015  |           |

(Continued)

OTHER PUBLICATIONS

Machine Translation of JP-2012235560-A, Eiji Harada, Publication Year 2012, Total pp. 28 (Year: 2020).*

*Primary Examiner* — Teresa M Ekiert
*Assistant Examiner* — Sarkis A Aktavoukian
(74) *Attorney, Agent, or Firm* — Oliff PLC

(57) ABSTRACT

A bending device for a wire includes a holder including a stepped part, the stepped part includes a side-surface corner and a flat surface, and the side-surface corner includes a curved surface. The bending device includes a guide member configured to push the wire against and along the curved surface, and the guide member revolves around a rotational axis of the guide member. The rotational axis of the guide member is disposed on a same axis as a center of the circle defining the curved surface of the holder.

5 Claims, 6 Drawing Sheets

(56) References Cited

FOREIGN PATENT DOCUMENTS

JP          2016-152652 A     8/2016
WO     WO-2009142097 A1 *  11/2009   ............... H02K 3/18

* cited by examiner

RELATED ART

RELATED ART

BENDING DEVICE FOR A WIRE

INCORPORATION BY REFERENCE

The disclosure of Japanese Patent Application No. 2016-252620 filed on Dec. 27, 2016 including the specification, drawings and abstract is incorporated herein by reference in its entirety.

BACKGROUND

1. Technical Field

The present disclosure relates to a bending device for a wire.

2. Description of Related Art

In a coil used in a rotor and a stator of a rotary machine such as a motor and an electric power generator, a wire, especially rectangular wire, is used as an element wire for the purpose of enhancement of a space factor in some cases. In such a case, the rectangular wire is held between a flat surface of a stepped part of a holder and a flange of a shaft inserted through the holder, a guide member is brought to revolve so as to push the rectangular wire against and along a curved part formed at a side-surface corner of the stepped part of the holder to bend the rectangular wire, and this bending step is repeated to form the coil (for example, Japanese Patent Application Publication No. 2016-152652).

SUMMARY

In a common wire bending device, as shown in FIG. 8, a guide member 101 rotates around a central axis AX0 of a shaft 102, and thus a rotational center α of the guide member 101 is different from a center β of a center of a circle defining a curved surface 103a of a holder 103. Hence, it is difficult to properly push the wire 104 against the curved surface 103a of the holder 103 at the beginning and the end of bending the wire 104; thus, it might be difficult to accurately bend the wire 104. Note that FIG. 8 shows a state in which the wire 104 is properly pushed against the curved surface 103a of the holder 103. In FIG. 8, a revolution track of the guide member 101 is indicated by a solid arrow, and the guide member 101 having revolved is indicated by a two-dot chain line. In addition, in FIG. 8, a position of the shaft 102 is indicated by a dash-dot line.

The present disclosure has been made in light of the above problem, and realizes a bending device for a wire capable of bending the wire with a high accuracy.

One aspect of the present disclosure is directed to a bending device for a wire. The bending device for a wire includes a holder including a stepped part. The stepped part includes a side-surface corner and a flat surface, and the side-surface corner includes a curved surface. The bending device includes a guide member configured to push a wire against and along the curved surface, the guide member revolves around a rotational axis of the guide member. The rotational axis of the guide member is disposed on the same axis as a center of a circle defining the curved surface of the holder. The "same axis" referred to herein is a concept that includes not only the strictly same axis, but also the "substantially same axis" from a view point of the common general technical knowledge. Through this configuration, it is possible to properly push the wire against and along the curved surface of the holder from the beginning to the end of bending the wire. Through this, it is possible to accurately bend the wire with a desired radius.

The first aspect of the present disclosure may further include a first shaft including a flange portion located opposite to the flat surface relative to the wire. A central axis of the first shaft may be disposed at a position offset from the rotational axis of the guide member. The first shaft may be coupled to a push rod. The push rod configured to drive in an axial direction may allow the wire to be held between the holder and the flange. A central axis of the push rod may be disposed on the same axis as the rotational axis of the guide member.

In the first aspect of the present disclosure, the wire may be a rectangular wire.

The first aspect of the present disclosure may further include a first side surface and a second side surface in the stepped part of the holder. The first side surface and the second side surface may be arranged via the side-surface corner, and an angle defined between the first side surface and the second side surface may be 90° or less.

In the first aspect of the present disclosure may include a second shaft provided with the guide member. The second shaft may include a cylinder portion and an arm portion, and the guide member may be disposed at an end of the arm portion. The cylinder portion may surround the push rod, and the guide member may revolve by the cylinder portion revolving around a rotational axis of the cylinder portion. In addition, the bending device for a wire may include a fixing jig including a through-hole where the cylinder portion is accommodated. A center of the through-hole may be disposed on the same axis as the rotational axis of the cylinder portion and the center of the circle defining the curved surface of the holder.

Furthermore, in the first aspect of the present disclosure, the first shaft may include a shaft portion, the shaft portion may include a first end and a second end, the first end may be coupled to the flange portion, a central axis of the flange portion may be disposed on the substantially same axis as a central axis of the shaft portion, and the shaft portion may include a retroflex portion that is retroflex and enlarged in diameter as the shaft portion goes from the second end toward the first end.

According to the present disclosure, it is possible to realize a bending device for a wire capable of bending the wire with a high accuracy.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENT

Hereinafter, a specific embodiment to which the present disclosure is applied will be described with reference to drawings. However, the present disclosure is not limited to the following embodiment. For clarification of the description, the description and the drawings below will be appropriately simplified.

In the following description, for clarification of the description, the description will be provided by using a three-dimensional coordinate system (an x-y-z coordinate system).

Figure 1:
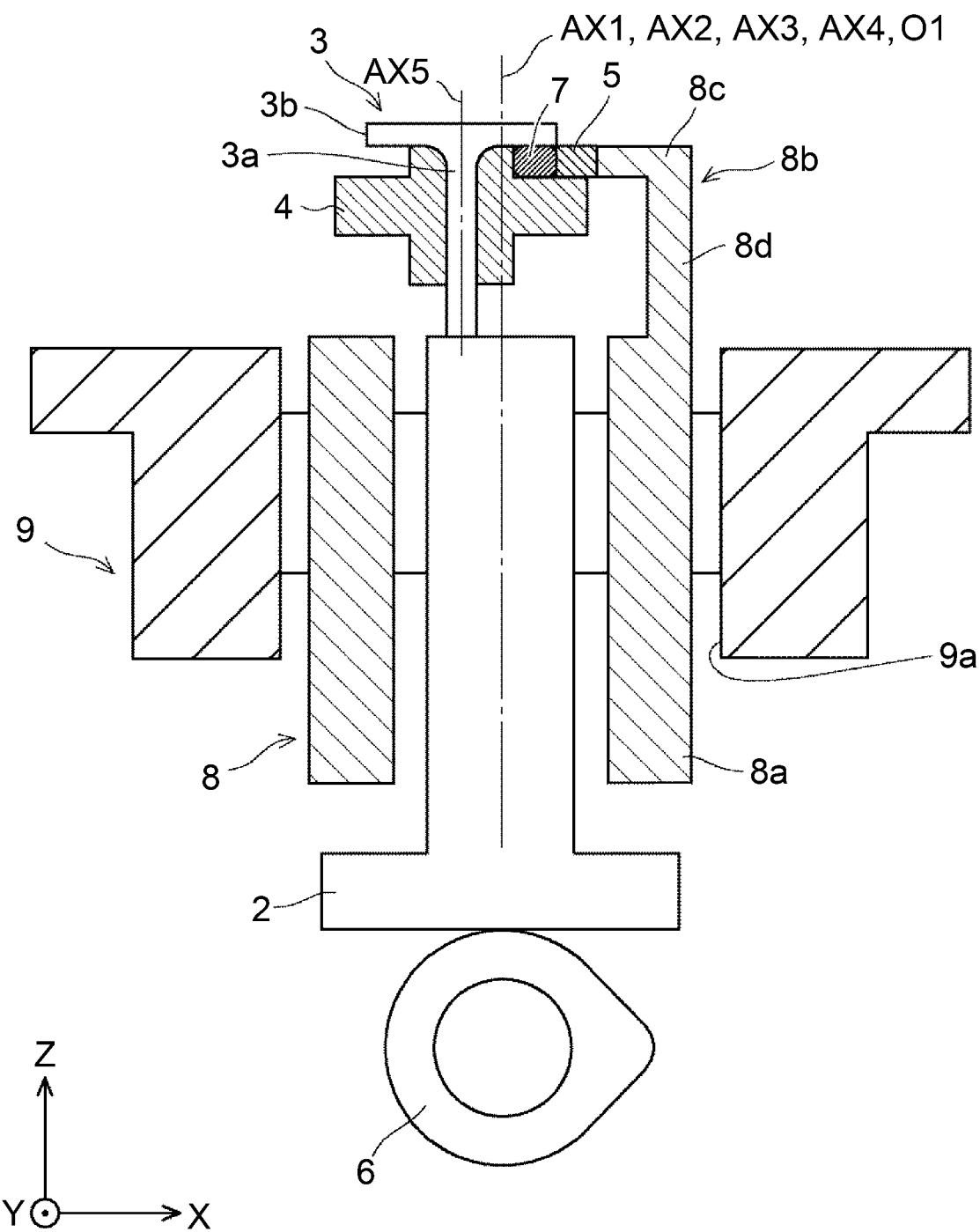
FIG. 1 is a cross sectional view schematically showing a bending device for a wire of an embodiment.

A bending device for a wire of the present embodiment (hereinafter, referred to simply as a "bending device") 1 is suitable for forming a coil used in a rotor and a stator of a rotary machine such as a motor and an electric power generator. As shown in FIG. 1, the bending device 1 includes a push rod 2, a shaft 3 (a first shaft), a holder 4, and a guide member 5.

As shown in FIG. 1, the push rod 2 is a shaft member extending in a z-axis direction, and driven (reciprocated) in the z-axis direction by driving means. The push rod 2 of the present embodiment is formed into a columnar shape, and a cam 6 is in contact with a surface on a z-axis minus side of the push rod 2. Here, the z-axis minus side denotes an opposite side to a direction indicated by an arrow of the z-axis shown in FIG. 1. Through this configuration, the push rod 2 is driven by rotational driving of the cam 6 in the z-axis direction. However, the shape of the push rod 2 is not limited to the columnar shape, and may be formed into a rectangular shape.

As shown in FIG. 1, the shaft 3 is coupled to a surface on a z-axis plus side of the push rod 2. The shaft 3 of the present embodiment includes a shaft portion 3a and a flange portion 3b, The shaft portion 3a is formed into a columnar shape, and protrudes from the surface on the z-axis plus side of the push rod 2 toward the z-axis plus side.

Figure 2:
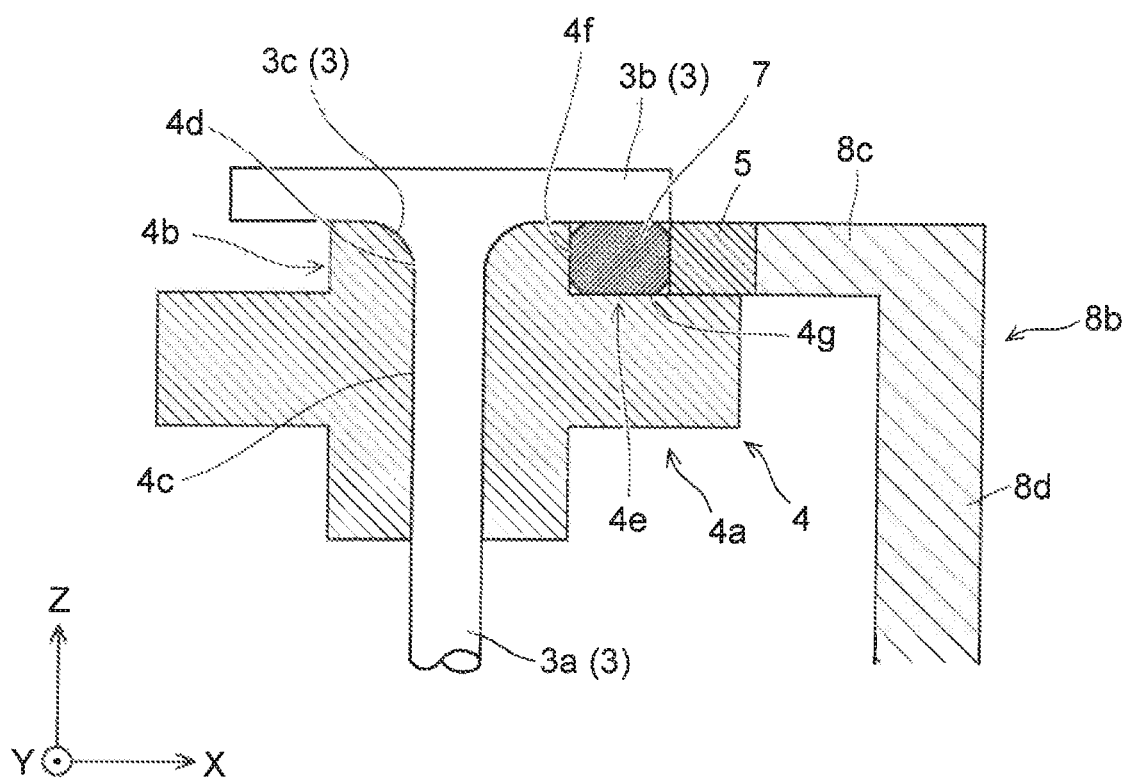
FIG. 2 is a cross sectional view schematically showing a holder and a vicinity thereof in the bending device for a wire of the embodiment.

The flange portion 3b is formed into a disk shape. The shaft portion 3a includes a first end and a second end, and an end on the z-axis plus side (the first end) of the shaft portion 3a is coupled to the flange portion 3b. In this case, the central axis of the flange portion 3b is disposed on the substantially same axis as the central axis of the shaft portion 3a. Here, as shown in FIG. 2, it is preferable that a portion on the z-axis plus side of the shaft portion 3a is formed with a retroflex portion 3c that is retroflex (i.e., formed with a fillet between the shaft portion 3a and the flange portion 3b) and enlarged in diameter as it goes toward the z-axis plus side (as it goes from the second end toward the first end). Through this, it is possible to suppress stress concentration onto the coupled part between the shaft portion 3a and the flange portion 3b.

As shown in FIG. 2, the holder 4 holds a wire (a rectangular wire) 7 between the holder 4 and the flange portion 3b of the shaft 3. The rectangular wire 7 is formed by coating a conductive wire having a substantially rectangular-shaped cross section with an electric insulating layer. The holder 4 of the present embodiment includes a base portion 4a and a bend receiving portion 4b. The base portion 4a has a columnar shape as a basic shape thereof, and includes a through-hole 4c extending in the z-axis direction through a center of the base portion 4a.

The bend receiving portion 4b protrudes from the surface on the z-axis plus side of the base portion 4a, and is provided through the substantially center thereof with a through-hole 4d communicating with the through-hole 4c of the base portion 4a. The bend receiving portion 4b is smaller than the base portion 4a, as viewed from the z-axis side. Hence, the holder 4 includes a stepped portion 4e. A side surface 4f of the stepped portion 4e is composed of a side surface of the bend receiving portion 4b, and a flat surface 4g of the stepped portion 4c is composed of a surface on the z-axis plus side of the base portion 4a.

Figure 3:
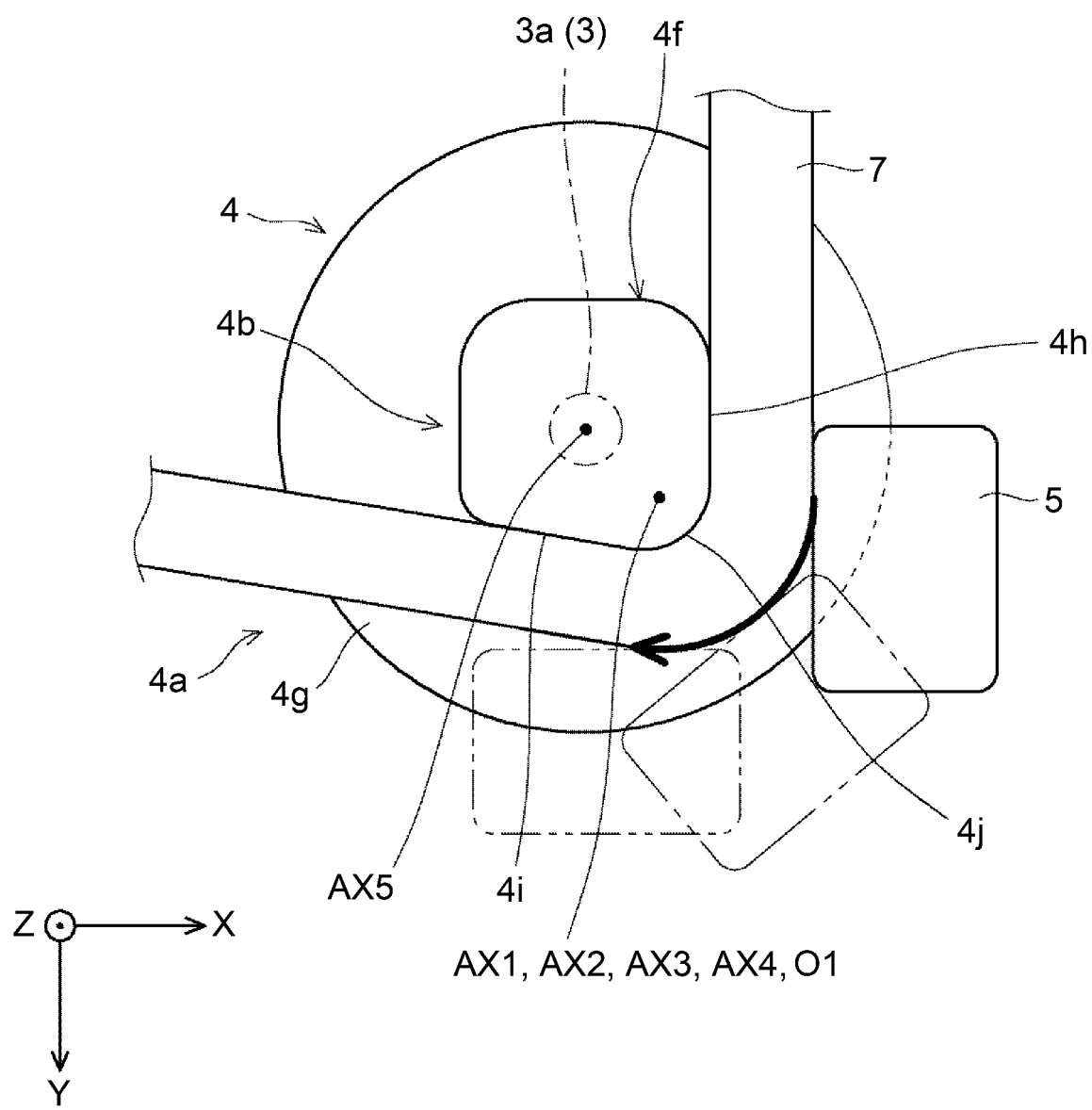
FIG. 3 is a plan view schematically showing the holder and a guide member in the bending device for a wire of the embodiment.

As shown in FIG. 3, in the above-configured side surface of the stepped portion 4e, a first side surface 4h (a first side surface) disposed on a substantially y-z plane, a second side surface 4i (a second side surface) disposed on a substantially x-z plane, and a curved surface 4j disposed between the first side surface 4h and the second side surface 4i (i.e., a side-surface corner) and extending along a circle with a desired radius. Here, taking amount of elastic deformation after the bending of the rectangular wire 7 into consideration, it is preferable that the second side surface 4i is inclined in a manner as to be displaced toward the y-axis minus side as it goes toward the x-axis minus side. That is, it is preferable that the first side surface 4h and the second side surface 4i are arranged at 90° or less via the side-surface corner.

The guide member 5 revolves in a manner as to push the rectangular wire 7 against and along the curved surface 4j of the holder 4.

In the above-configured bending device 1, a rotational axis AX1 of the guide member 5, a central axis AX2 of the push rod 2, and a center O1 of a circle defining the curved surface 4j of the holder 4 are arranged on the substantially same axis. This means that the central axis AX2 of the push rod 2 is disposed so as to pass through the center O1 of the circle defining the curved surface 4j of the holder 4, and the guide member 5 revolves around this central axis AX2. Here, the rotational axis AX1 of the guide member 5, the central axis AX2 of the push rod 2, and the curved surface 4j of the holder 4 are substantially parallel to each other in the z-axis direction.

As shown in FIG. 1, the guide member 5 of the present embodiment is provided with a center shaft 8 (a second shaft), and revolves along with the rotation of the center shaft 8. For example, the center shaft 8 includes a cylinder portion 8a and an arm portion 8b. For example, the cylinder portion 8a is formed into a columnar shape, and is inserted through a through-hole 9a of a fixing jig 9 along with the push rod 2 while the cylinder portion 8a surrounds the push rod 2. The cylinder portion 8a configured in this manner is supported by the fixing jig 9 via a bearing (not illustrated).

In this case, a rotational axis AX3 of the cylinder portion 8a is disposed on the substantially same axis as the central axis AX2 of the push rod 2 passing through the center O1 of the circle defining the curved surface 4j of the holder 4. Note that a gap between the cylinder portion 8a and the push rod 2 is preferably sealed by a bush (not illustrated). Through this, it is possible to suppress rattling when the center shaft 8 is rotated.

The arm portion 8b couples the guide member 5 to the cylinder portion 8a. For example, the arm portion 8b includes an extending portion 8c extending toward the rotational axis AX3 of the cylinder portion 8a and a coupling portion 8d coupling the extending portion 8c to the cylinder portion 8a. One end of the extending portion 8c is provided with the guide member 5. The other end of the extending portion 8c is coupled to the cylinder portion 8a via the coupling portion 8d.

Driving force is transmitted from a driving unit (not illustrated) to the center shaft 8 having this configuration so as to be rotated. Through this, the rotational axis AX1 of the guide member 5 is arranged on the substantially same axis as the rotational axis AX3 of the cylinder portion 8a. The guide member 5 revolves around the central axis AX2 of the push rod 2 passing through the center O1 of the circle defining the curved surface 4j of the holder 4. That is, the rotational axis AX3 of the cylinder portion 8a serves as the rotational axis AX1 of the guide member 5. Note that the rotational axis AX3 of the cylinder portion 8a of the present embodiment is arranged also on the substantially same axis as a central axis AX4 of the through-hole 9a of the fixing jig 9.

Here, if a central axis AX5 of the shaft 3 is arranged on the substantially same axis as the central axis AX2 of the push rod 2, the thickness of the shaft 3 cannot be secured. Therefore, the central axis AX5 of the shaft 3 is arranged at a position offset from the central axis AX2 of the push rod 2. For example, the central axis AX5 of the shaft 3 is disposed at a position offset from the central axis AX2 of the push rod 2 relative to movement of the central axis AX2 of the push rod 2 from a state in which the central axis AX2 of the push rod 2 is disposed on the same axis as the central axis AX5 of the shaft 3 to a position where the central axis AX2 passes through the center O1 of the circle defining the curved surface 4j of the holder 4.

Next, a flow of forming the coil by using the bending device 1 of the present embodiment will be described. First, a surface having a longer diameter of the cam 6 is brought to come into contact with the push rod 2 so as to move the flange portion 3b of the shaft 3 to the z-axis plus side.

Then, the rectangular wire 7 is fed out by a feeder (not illustrated) by a predetermined amount in the y-axis plus direction so as to place the rectangular wire 7 in the stepped portion 4e of the holder 4. At this time, the rectangular wire 7 is arranged such that the rectangular wire 7 substantially comes into contact with the first side surface 4h of the stepped portion 4e of the holder 4, and protrudes from the bend receiving portion 4b of the holder 4 toward the y-axis plus side by a predetermined amount.

Next, the cam 6 is rotated to shift the push rod 2 toward the z-axis minus side so as to hold the rectangular wire 7 between the flange portion 3b of the shaft 3 and the flat surface 4g of the holder 4.

Next, the center shaft 8 is rotated by driving the driving means, and the guide member 5 is brought to revolve around the rotational axis AX1 in the arrow direction in FIG. 3 so as to push the rectangular wire 7 against and along the curved surface 4j of the holder 4. At this time, since the rotational axis AX1 passes through the center of the circle defining the curved surface 4j of the holder 4, the rectangular wire 7 can properly be pushed against the curved surface 4j of the holder 4 from the beginning to the end of bending the rectangular wire 7. Through this, the rectangular wire 7 can accurately be bent with a desired radius. In FIG. 3, a revolution track of the guide member 5 is indicated by a solid-line arrow, and the guide member 5 having revolved is indicated by a two-dot chain line. In FIG. 3, the arrangement of the shaft portion 3a of the shaft 3 is indicated by a one-dot chain line.

Figure 4:
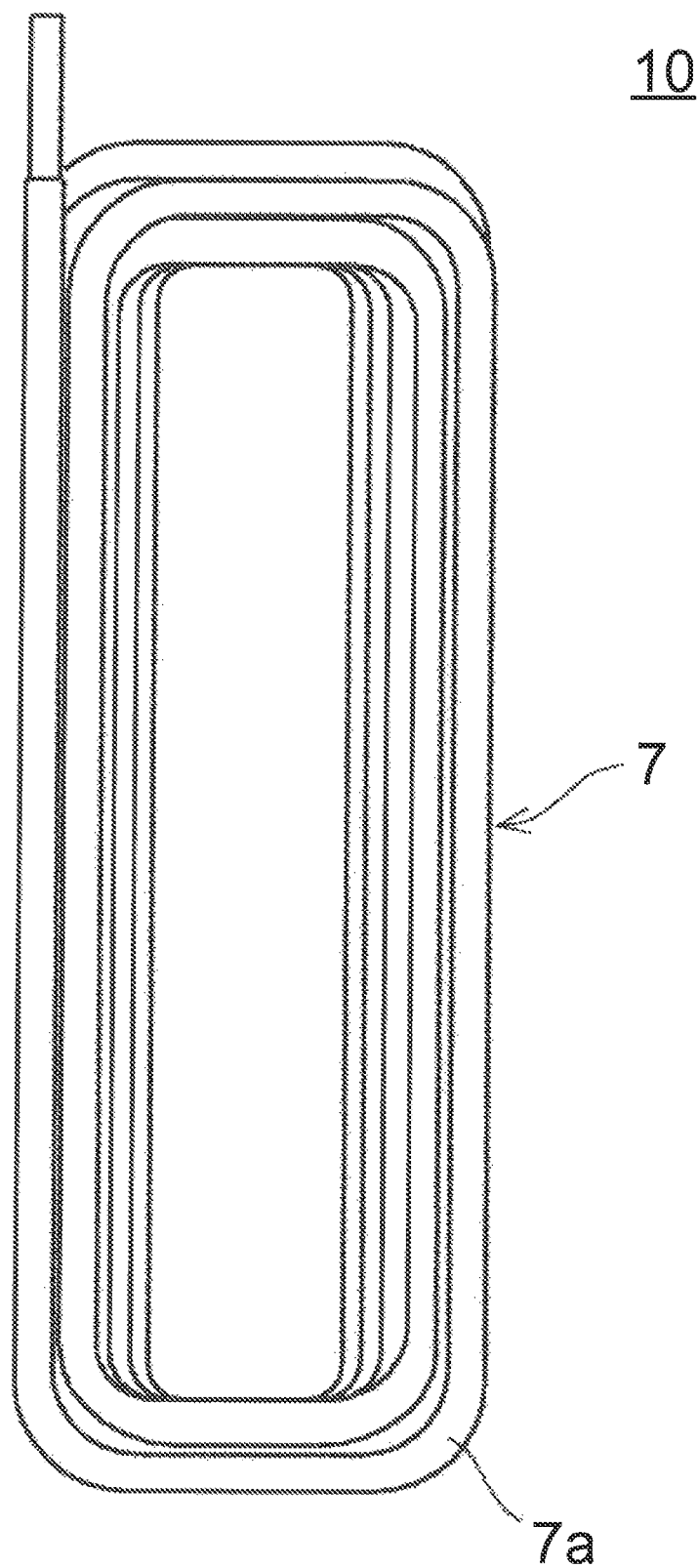
FIG. 4 is a view schematically showing a coil formed by the bending device for a wire of the embodiment.

Next, the cam 6 is rotated to move the push rod 2 toward the z-axis plus side so as to release restraint of the rectangular wire 7, and feed the rectangular wire 7 in the y-axis plus direction by the feeder by a predetermined amount. Thereafter, the above steps are repeated so as to form the coil 10 wound in a substantially rectangular shape as shown in FIG. 4.

Figure 5:
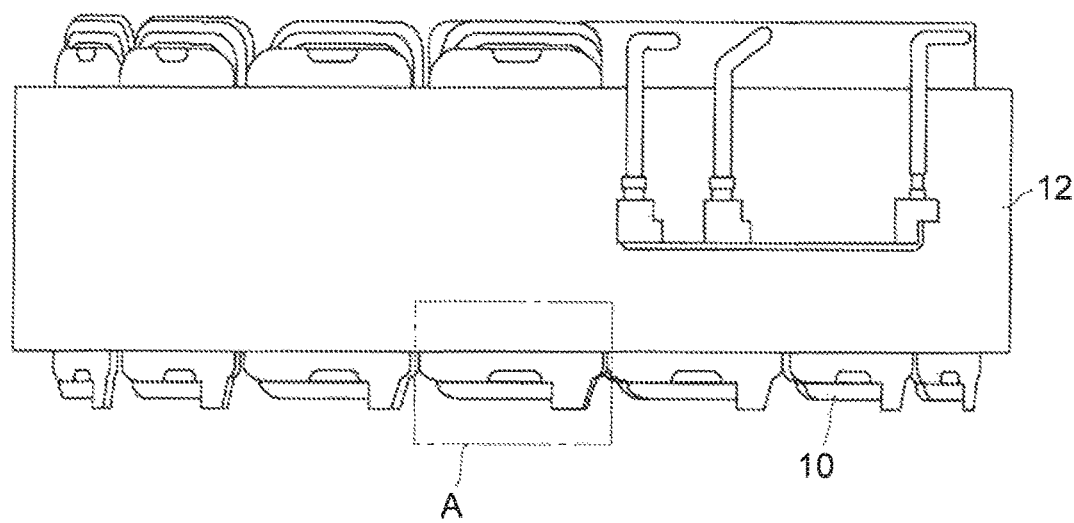
FIG. 5 is a view schematically showing a common stator.

The above-configured coil 10 may be used in a stator 11 as shown in FIG. 5, for example. At this time, teeth portion of a stator core 12 of the stator 11 is inserted into the coil 10, so that the coil 10 is provided to the stator core 12.

Figure 6:
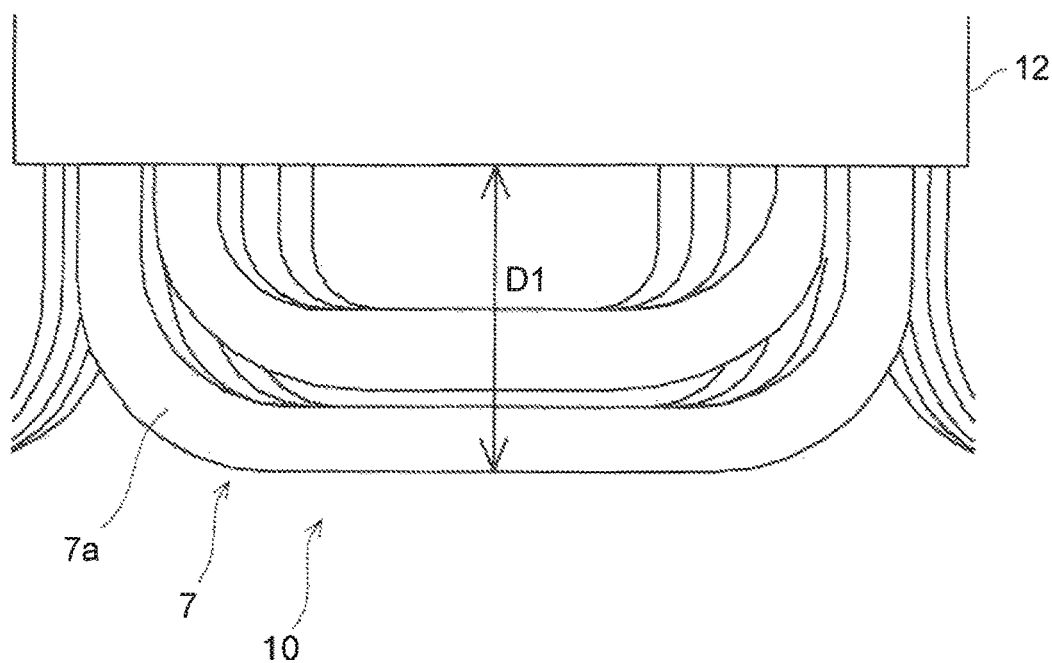
FIG. 6 is an enlarged view showing a state in which a stator core is provided with the coil formed by using a common bending device for a wire, as a part A of FIG. 5.

Here, if the rectangular wire 7 is bent using a common bending device, it is difficult to properly push the rectangular wire 7 against the curved surface of the holder at the beginning and the end of bending the rectangular wire 7 in the above manner, so that a radius of a bent portion 7a of the rectangular wire 7 becomes greater. Consequently, as shown in FIG. 6, a protrusion D1 from the stator core 12 of the coil 10 becomes greater. This means that the rectangular wire 7 used in the coil 10 has a longer length, which is disadvantageous in weight and copper loss of the motor.

Figure 7:
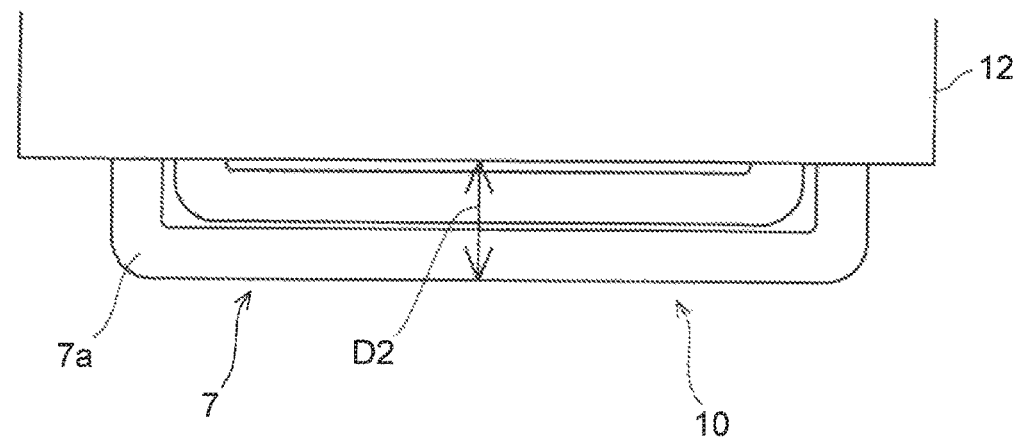
FIG. 7 is an enlarged view showing a state in which a stator core is provided with the coil formed by using the bending device for a wire of the embodiment, as the part A of FIG. 5.
Figure 8:
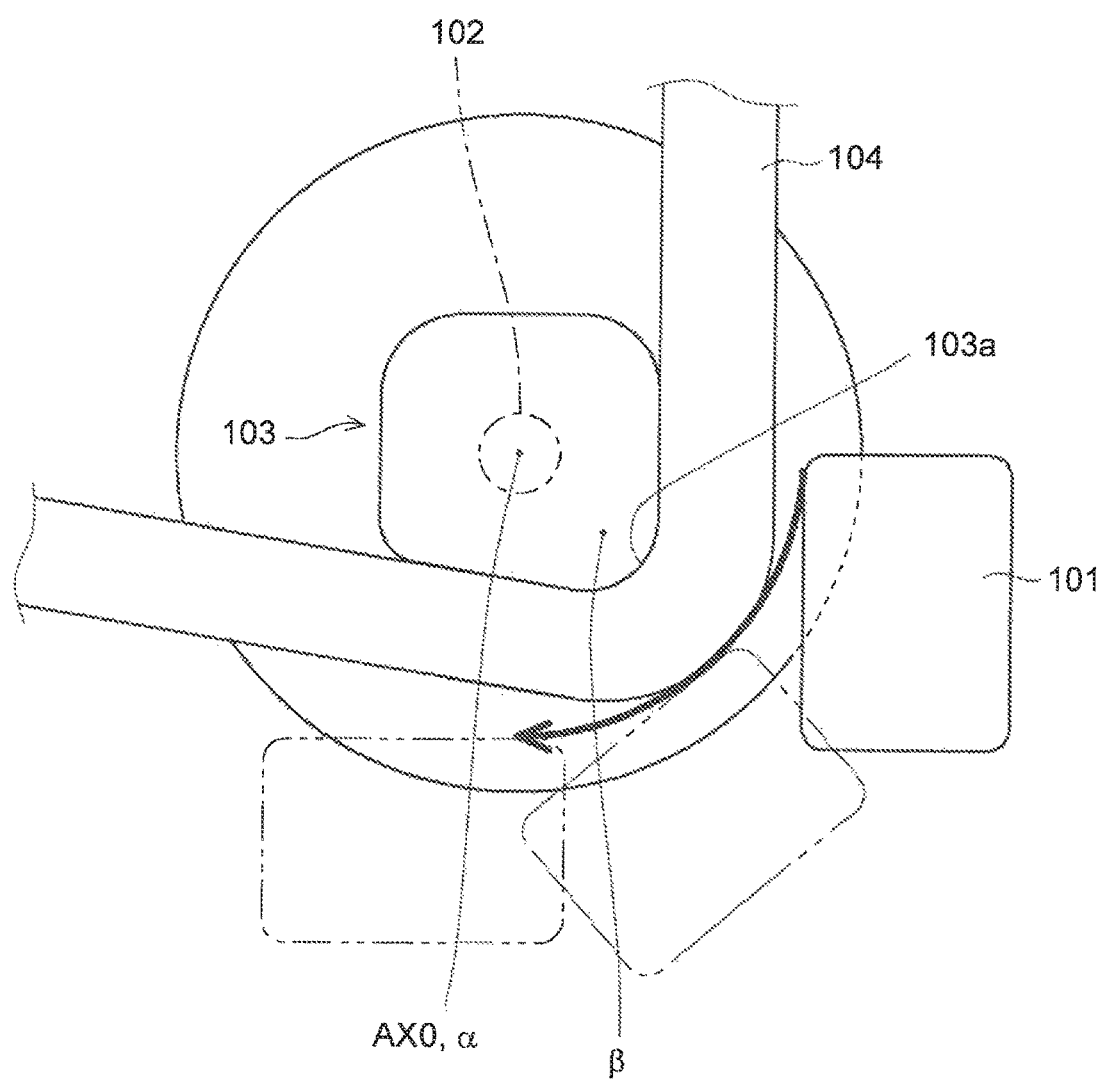
FIG. 8 is a plan view schematically showing a holder and a guide member in the common bending device for a wire.

To the contrary, the bending device 1 of the present embodiment can produce the coil 10 having a smaller radius of the bent portion 7a of the rectangular wire 7, compared with one produced by the common bending device. As a result, as shown in FIG. 7, a protrusion D2 of the coil 10 from the stator core 12 can be reduced. This means that the rectangular wire 7 used in the coil 10 has a shorter length, which is advantageous in weight and copper loss of the motor.

In this manner, in the bending device 1 of the present embodiment, the guide member 5 revolves around the rotational axis AX1 passing through the center O1 of the circle defining the curved surface 4j of the holder 4. Hence, it is possible to properly push the rectangular wire 7 against the curved surface 4j of the holder 4 from the beginning to the end of bending the rectangular wire 7. Through this, it is possible to accurately bend the rectangular wire 7 with a desired radius. The rotational axis AX1 of the guide member 5 may deviate from the center O1 of the circle defining the curved surface 4j of the holder 4 within a range where the rectangular wire 7 can be bent with a desired radius.

In the bending device 1 of the present embodiment, as with a common bending device, the rotational axis AX1 of the guide member 5 is disposed on the substantially same axis as the central axis AX2 of the push rod 2, and thus it is possible to accurately bend the rectangular wire 7 with a desired radius without complicating the configuration of the bending device, compared with the common bending device.

The present disclosure is not limited to the above embodiment, and may appropriately be changed without departing from the scope of the disclosure.

What is claimed is:

1. A bending device for a wire comprising:
    a holder including a stepped part, the stepped part including a side-surface corner and a flat surface, the side-surface corner including a curved surface;
    a guide member configured to push the wire against and along the curved surface, the guide member revolving around a rotational axis of the guide member, the rotational axis of the guide member and a center of a circle defining the curved surface of the holder being coaxially disposed on a first axis;
    a first shaft including a flange portion located opposite to the flat surface relative to the wire, a central axis of the first shaft being disposed at a position offset from the first axis of the guide member; and
    a push rod to which the first shaft is coupled, the push rod configured to drive in an axial direction allowing the wire to be held between the holder and the flange portion, a central axis of the push rod being coaxial with the first axis of the guide member.

2. The bending device for the wire according to claim 1, wherein
the wire is a rectangular wire.

3. The bending device for the wire according to claim 1, wherein
the stepped part of the holder includes a first side surface and a second side surface, the first side surface and the second side surface being arranged via the side-surface corner, an angle defined between the first side surface and the second side surface being 90° or less.

4. The bending device for the wire according to claim 1, further comprising:
a second shaft provided with the guide member, the second shaft includes a cylinder portion and an arm portion, the guide member is disposed at an end of the arm portion, the cylinder portion surrounds the push rod, and the guide member revolving together with the cylinder portion around a rotational axis of the cylinder portion, a fixing jig including a through-hole where the cylinder portion is accommodated, a center of the through-hole being coaxial with the rotational axis of the cylinder portion and the center of the circle defining the curved surface of the holder.

5. The bending device for the wire according to claim 1, wherein
the first shaft includes a shaft portion,
the shaft portion includes a first end and a second end, the first end being coupled to the flange portion,
a central axis of the flange portion is disposed coaxial with a central axis of the shaft portion,
and
the shaft portion includes a retroflex portion that is retroflex and enlarged in diameter as the shaft portion goes from the second end toward the first end.

* * * * *